(12) United States Patent
Chen et al.

(10) Patent No.: US 8,284,175 B2
(45) Date of Patent: Oct. 9, 2012

(54) LIGHT POINTING DEVICE EMPLOYED IN INPUT APPARATUS, DRIVING METHOD AND INPUT APPARATUS USING THE SAME

(75) Inventors: Po Yang Chen, Hsien (TW); Kei Hsiung Yang, Hsien (TW)

(73) Assignee: Hannstar Display Corporation, New Taipei (TW)

( * ) Notice: Subject to any disclaimer, the term of this patent is extended or adjusted under 35 U.S.C. 154(b) by 762 days.

(21) Appl. No.: 12/021,601

(22) Filed: Jan. 29, 2008

(65) Prior Publication Data
US 2008/0284757 A1    Nov. 20, 2008

(30) Foreign Application Priority Data
May 16, 2007    (TW) ................................ 96117338 A

(51) Int. Cl.
*G09G 3/22* (2006.01)
(52) U.S. Cl. .................. 345/183; 345/104; 345/105
(58) Field of Classification Search .................. 345/183, 345/104, 105
See application file for complete search history.

(56) References Cited

U.S. PATENT DOCUMENTS

| | | | |
|---|---|---|---|
| 3,997,891 A * | 12/1976 | Iwamura et al. | 345/180 |
| 5,966,108 A | 10/1999 | Ditzik | |
| 6,724,370 B2 | 4/2004 | Dutta et al. | |
| 2003/0197691 A1 | 10/2003 | Fujiwara et al. | |
| 2003/0234346 A1* | 12/2003 | Kao | 250/221 |
| 2004/0066379 A1 | 4/2004 | Ise et al. | |
| 2004/0189621 A1 | 9/2004 | Cho et al. | |
| 2005/0253801 A1* | 11/2005 | Kobayashi | 345/105 |
| 2006/0176266 A1* | 8/2006 | Pak et al. | 345/104 |

FOREIGN PATENT DOCUMENTS

| | | |
|---|---|---|
| TW | 591504 B | 6/2004 |
| TW | I233041 B | 5/2005 |

* cited by examiner

*Primary Examiner* — Kevin M Nguyen
*Assistant Examiner* — Kenneth B Lee, Jr.
(74) *Attorney, Agent, or Firm* — Jianq Chyun IP Office

(57) ABSTRACT

A light pointing device employed in an input apparatus comprises a signal receiving interface and a light emitting component. The signal receiving interface is used to receive a system signal from the input apparatus. The light emitting component can generate a flashing light source whose intermittence cycle is synchronized with the reference clock cycle of the system signal. Furthermore, the ratio of the intermittence cycle of the flashing light source to the reference clock cycle of the system signal is a natural number.

10 Claims, 5 Drawing Sheets

LIGHT POINTING DEVICE EMPLOYED IN INPUT APPARATUS, DRIVING METHOD AND INPUT APPARATUS USING THE SAME

BACKGROUND OF THE INVENTION

1. Field of the Invention

The present invention relates to a light pointing device employed in an input apparatus, driving method and an input apparatus using the same, and more particularly, to a light pointing device employed in the display panel with a input sensing function and a method of driving the light pointing device to generate flashing light.

2. Description of the Related Art

Liquid crystal display panels have been widely utilized as the display devices of electronic appliances in recent years, for instance mobile phones, personal digital assistants (PDA), notebook computers and tablet computers. The liquid crystal display comprises an array substrate and a driving circuit. A plurality of pixels are disposed at the intersections of scan lines and signal lines on the substrate. Furthermore, the driving circuit drives the scan lines and the signal lines.

In another aspect, input-type display, such as a touch-type display, etc., is the optimum solution for products that require a user-friendly design. In particular, input and output interfaces are integrated with a display (monitor); such integration cannot, be achieved by traditional input apparatus. Traditional display devices can accept input commands from a finger or a touch control pen, and have additional sensors or a sensing film disposed on the screen. Therefore, the cost is increased, and the optical performance is affected. Recently, there have been proposed techniques that integrate the sensor array of amorphous silicon thin film transistors (a-Si TFTs) into the array substrate of an a-Si TFT-LCD. Furthermore, photosensitive sensors are individually embedded into specific pixels of the display. This, type of LCD panel is also called an in-cell touch panel.

Sensors used today are classified into two kinds, an electric charge type (also known as a capacitive type) and a current type (or resistive type). FIG. 1 is a circuit diagram of a capacitive sensor. The capacitive sensor 10 comprises a readout TFT 11, a photosensitive TFT 12, and a storage capacitor 13. The photosensitive TFT 12 will discharge the storage capacitor 13 when the photosensitive TFT 12 is exposed to sufficient light. When the next frame is displayed, a gate signal applied to a scan line 15 will turn on the readout TFT 11, and the storage capacitor 13 will be recharged again and detect the amount of electric charge by the read line 14. Furthermore, $V_{bias}$ shown, in FIG. 1 represents a bias voltage.

Referring to FIG. 2, a resistive sensor 20 has no storage capacitor to store electric charges. After the photosensitive TFT 22 senses light, current will pass through the readout TFT 21. At the same time, the readout TFT 21 is turned on by a gate signal applied to the scan line 25. Simultaneously, the read line 24 will be used to detect the amperage of the current passing through. For both the capacitive type and resistive type of sensors, the a-Si TFT is subjected to light to cause an increase in channel carriers, and therefore raises the current level passing through. Basically, the variances in the photocurrent level are used as the sensed signal.

Alternatively, based on operating modes, the embedded touch panel can also be classified into a shadow type or an excess light type. The former directly compares the light, intensity between its environment and where light is shadowed by the finger, thereby achieving the touch pointing, function. However this operating mode will be affected when the light intensity from the environment is too low. That is, the contrast between the obscure environment and where light is shadowed by the finger is decreased so that the touch panel cannot recognize the actual input location pointed to by the user. The latter operating mode (excess light) can solve this problem by pairing with an auxiliary light source or a light pen, and ensuring proper operation under any environment.

For touch panels used by mobile appliances, the excess light operating mode using the light pen is the better choice. However, power consumption of the light pen is an issue that will affect its workable period in mobile use. Therefore, how to design a light pen that, saves much power becomes an important topic.

SUMMARY OF THE INVENTION

One aspect of the present invention provides a light pointing device employed in an input apparatus, a liquid crystal display with an input function, and driving method thereof. The frequency of light generated from the light pointing device is synchronized to the system signal of the input apparatus such that the light is generated by the light pointing device substantially only during the effective light sensing time of the input apparatus. Therefore, such a light pointing device can reduce consumption of power.

According to this aspect of the present invention, a light pointing device employed in an input apparatus comprises a signal receiving interface and a light emitting component. The signal receiving interface is used to receive system signals from the input apparatus, and the light emitting component is used to generate an intermittent flashing light source, wherein the intermittence cycle of the flashing light source is synchronized with the reference clock cycle of the system signal. The ratio of the intermittence cycle of the flashing light source to the reference clock cycle of the system signal is a natural number.

The present invention further discloses a liquid crystal display with an input function comprising a liquid crystal display panel and a pointing device. The pointing device comprises a signal receiving interface for receiving system signals from the liquid crystal display panel, and a light emitting component for generating an intermittent flashing light source. The intermittence cycle of the flashing light source is synchronized with the reference clock cycle of the system signal. The ratio of the flashing cycle of the flashing light source to the reference clock cycle of the system signal is a natural number.

A method of driving the light pointing device according to the present invention comprises the steps of receiving a system signal from the input apparatus; generating a driving signal according to the system signal, wherein the driving signal is synchronized to a multiple of the reference clock cycle of the system signal; and driving the light pointing device by the system signal to generate an intermittent flashing light source.

BRIEF DESCRIPTION OF THE DRAWINGS

The invention will be described according to the appended drawings in which.

PREFERRED EMBODIMENT OF THE PRESENT INVENTION

Figure 1:
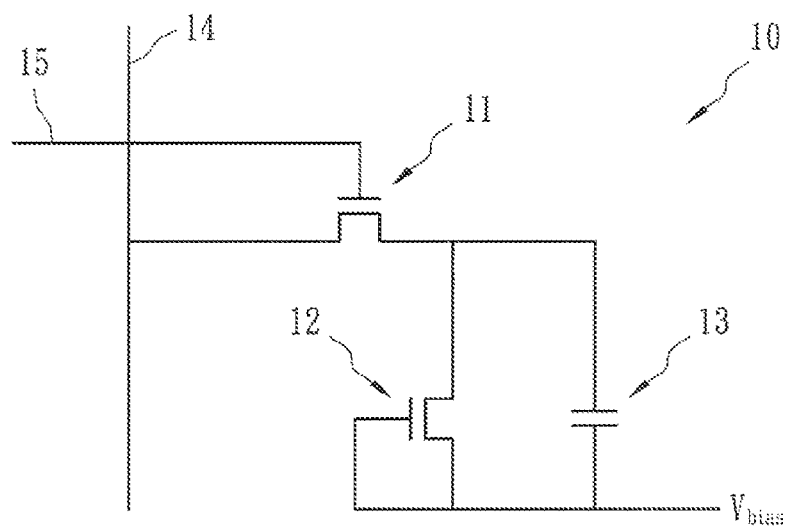
FIG. 1 is a circuit diagram showing a capacitive sensor.
Figure 2:
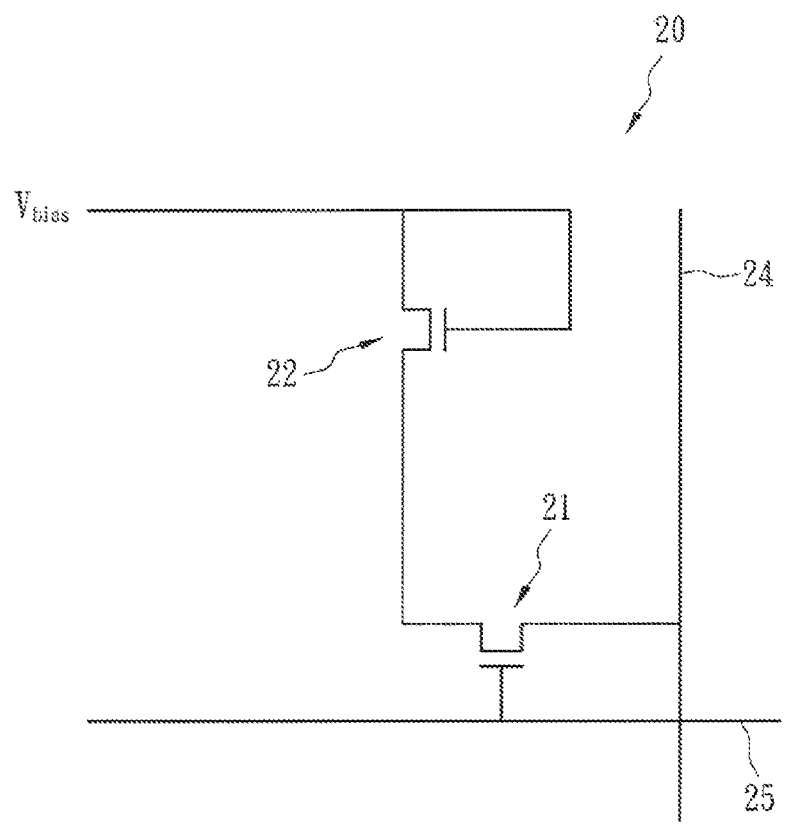
FIG. 2 is a circuit diagram showing a resistive sensor.
Figure 3:
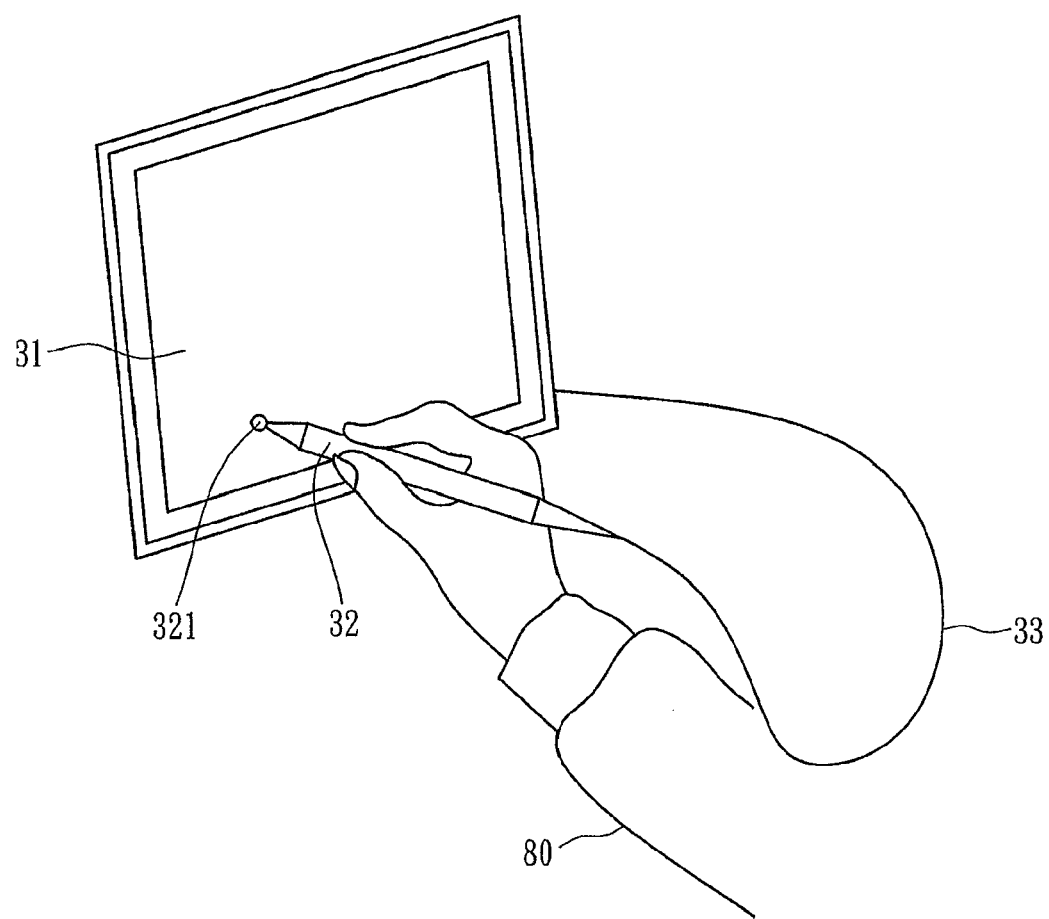
FIG. 3 is a schematic diagram illustrating an input apparatus operated by using a light pointing device according to the present invention.

FIG. 3 is a schematic diagram illustrating an input apparatus operated by using a light pointing device according to the present invention. A user 80 can hold a light pointing device 32 to choose commands or write characters on the input apparatus 31 (for example a touch panel). This input operation is completed by a flashing light source 321 generated from the light pointing device 32. The intermittence cycle of the flashing light source 321 is synchronized to the reference clock cycle of the system signal of the input apparatus 31, that is the intermittence cycle of the flashing light source 321 is a multiple of the reference clock cycle of the system signal, and the multiple vale can be a natural number N, in other words, the ratio of the intermittence cycle of the flashing light source to the reference clock cycle of the system signal is a natural number This reference clock cycle is obtained from a clock signal, a vertical start pulse STV or a vertical clock pulse CPV that is transmitted from the input apparatus 31 to the signal receiving interface of the light pointing device 32 through a signal cable 33, and is modulated according to the received signal to adapt to the intermittence cycle of the flashing light source 321, wherein the vertical start pulse STV and vertical clock pulse CPV are control signals derived from the reference clock cycle (or frequency) of the system signal.

The resolution of arranged sensors disposed in the input apparatus 31 could be lower than the resolution of actual pixels—each 4 by 4 pixels with one sensor for example. If the pixel resolution is 1024×768, then the resolution of the arranged sensors will be 256×192, and the cycle of photocurrent signals generated from the sensor is four times the cycle of the vertical clock pulse CPV. In this regard, a response to light exposure is active during a pulse occurring in the photocurrent signal, and power is wasted when light illuminates the sensor beyond the interval of each pulse of the photocurrent signal. That is, the read line does not output any pulses of the photocurrent signal during three quarters of working time. Therefore, the present invention tarns off the light of the light pointing device 32 when the sensor cannot respond to light exposure, thereby reducing the power consumption and extending the workable period by approximately four times. The light emitting diode is commonly used as the light emitting component in the light pointing device 32, since the advantage of the response time for the light emitting diode is in microseconds (μm).

Figure 4A:
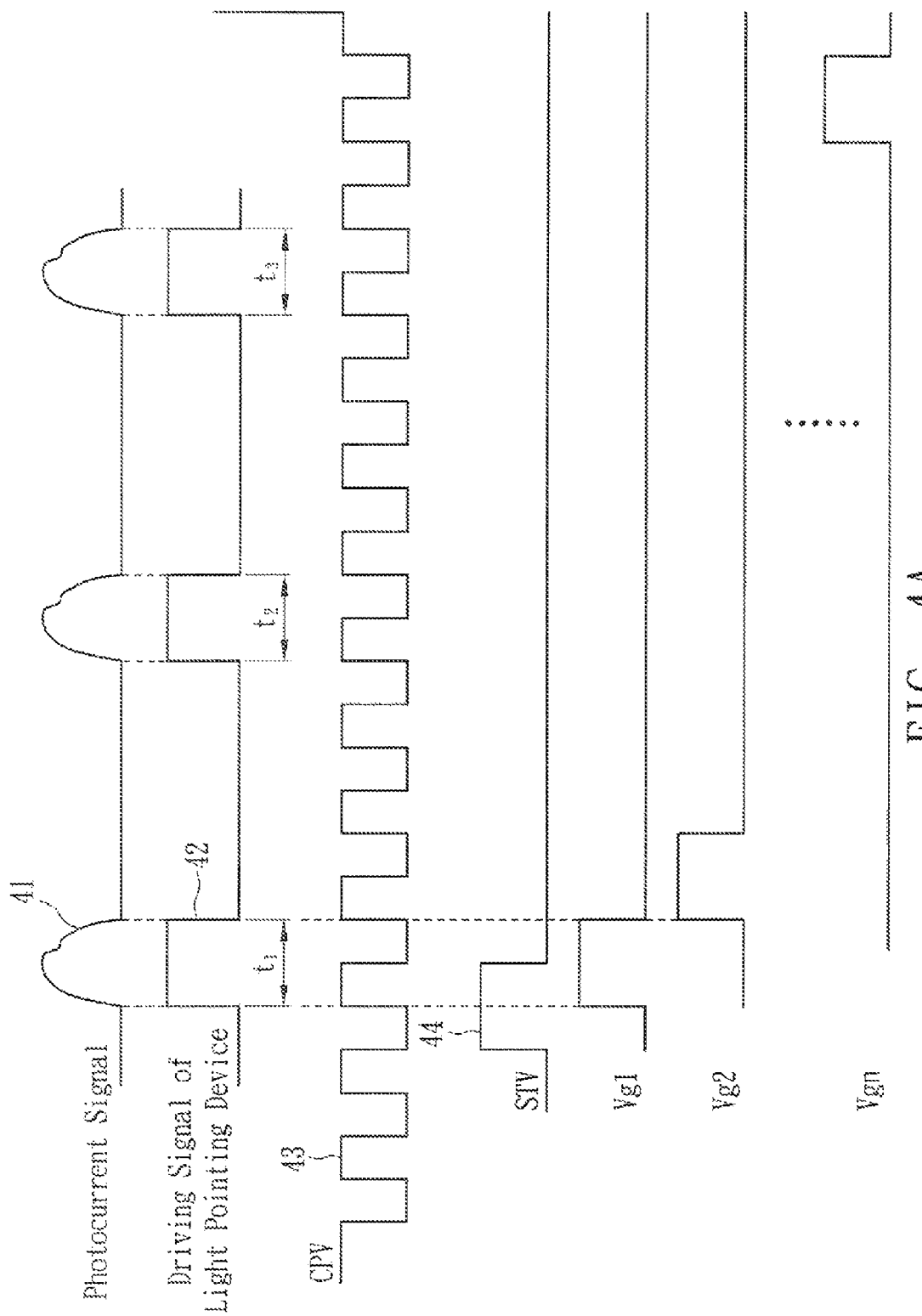
FIG. 4A is a timing diagram showing a driving signal of a light pointing device and a photocurrent signal of an input apparatus according to the present invention.
Figure 4B:
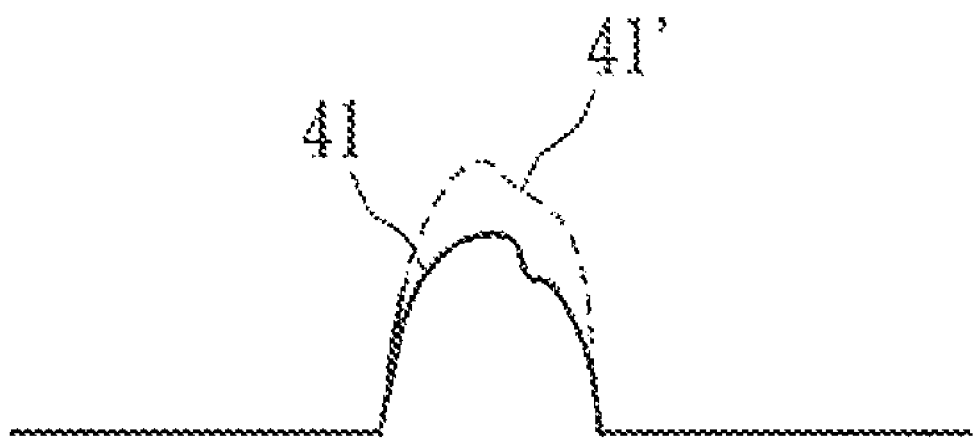
FIG. 4B is a waveform diagram showing a photocurrent signal generated from a light sensor during periods with light exposure and with no light exposure.

FIG. 4A is a timing diagram showing a driving signal of a light pointing device and a photocurrent signal of an input apparatus according to the present invention. FIG. 4A shows that a photocurrent pulse 41 is generated when a vertical clock pulse CPV is active. The pulse 42 of a driving signal enables the light pointing device 32 to generate an instantaneous light, and simultaneously, the sensor can sense the instantaneous light, such that the photocurrent signal 41 rises. Furthermore, at the start of each frame, a vertical start pulse STV 44 is generated, and a next frame restarts by executing a vertical scanning process. A vertical clock pulse CPV 43 which drives each row of pixels from the top of a frame during a horizontal scanning period sequentially generates gate pulses Vg1-Vgn for scanning each row of pixels according to a pulse 44. A pulse 42 for driving the light pointing device 32 is generated during each period with four widths of gate pulses, and consequently, the cycle of the flashing light source from the light pointing device 32 is synchronized with the cycle of pulse 41. FIG. 4B is a waveform diagram showing a photocurrent signal generated from a light sensor during periods with light exposure and with no light exposure. When an active sensor receives light from the light pointing device 32, the pulse 41 of the photocurrent signal is changed, into a pulse 41' with a higher current level.

Figure 5:
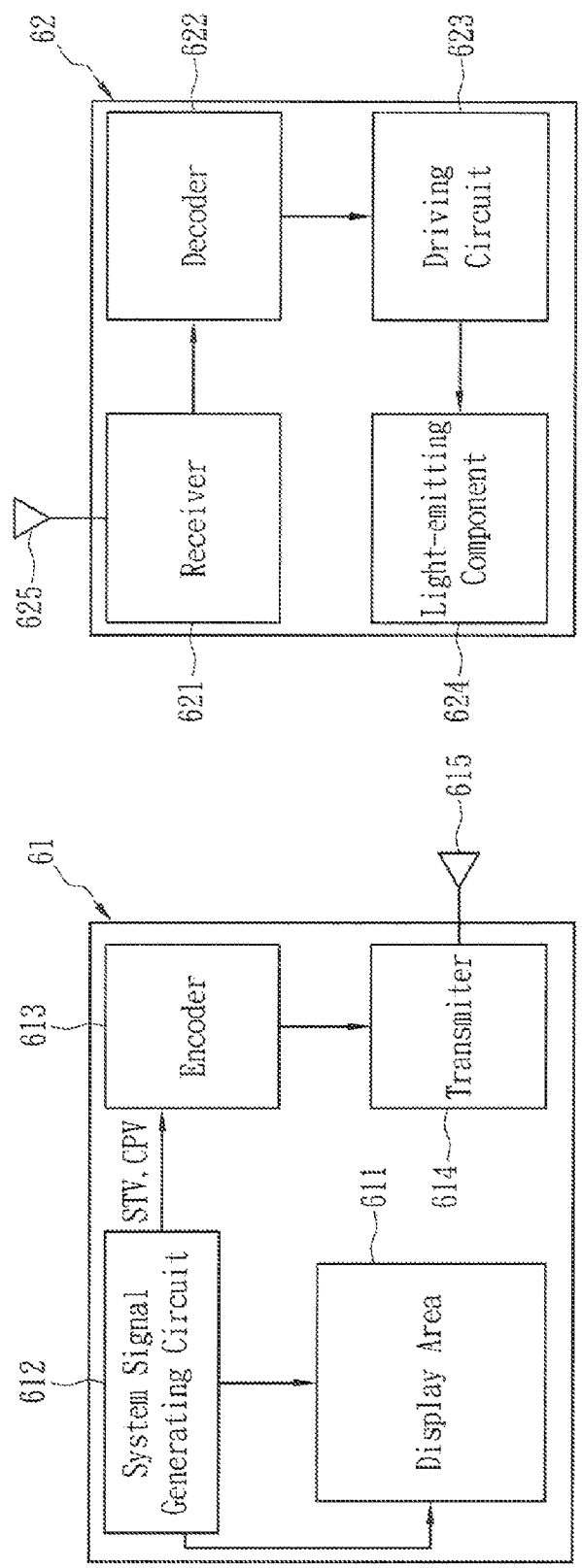
FIG. 5 is a circuit block diagram showing the light, pointing device and input apparatus according to the present invention.

In addition to transmitting a vertical start pulse STV or a vertical clock pulse CPV through a cable line 33, wireless communication can be employed to transmit signals so that mobile applications with this are conveniently used. FIG. 5 is a circuit block diagram showing a light pointing device of the present invention that utilizes a wireless signal receiving interface and a signal transmission interface of an input apparatus. The signal receiving interface of the light pointing device 62 comprises an antenna 625 and a receiver 621, and the signal transmission interface of an input apparatus 61 comprises an antenna 615 and a transmitter 614. The system signal generating circuit 612 of the input apparatus 61 generates a control signal and a driving signal to have a frame showing on a display area 611, and simultaneously, a vertical start pulse STV or vertical clock pulse CPV is sent to an encoder 613. Next, the encoder 613 modulates the signal according to a wireless communication format and the transmitter 614 transmits such a wireless signal to the light pointing device 62 through the antenna 615 by electromagnetic waves.

The light pointing device 62 receives the wireless signal of the vertical start pulse STV or vertical clock pulse CPV sent from the input apparatus 61 by the antenna 625. The decoder 622 decodes the processed signal received by the receiver 621 into a signal with a desired signal format for a driving circuit 623. Then, the driving circuit 623 sends driving signals to drive a light emitting component 624 to emit light with a constant flashing frequency. Since the response time of a light emitting diode is approximately in the order of microseconds (μm), the light emitting diode can be used as the light emitting component 624 to match the width of the gate pulse: for instance, the width of the gate pulse of a 15 inch XGA liquid crystal display panel is approximately 20 microseconds. Furthermore, although a light emitting diode is used as an example of the light emitting component in the above embodiment, the present invention is not restricted to such an application. In another embodiment of the present invention, a light emitting component with a response time that matches the frequency of the gate pulse can be used. The input apparatus 61 represented as a liquid crystal display in this embodiment is also not limited to the liquid crystal display, and can further include other display devices or other input apparatus.

The technical contents and technical features of the present invention are as disclosed above. It will be appreciated by those skilled in the art that changes could be made to the embodiments described above without departing from the broad inventive concept thereof. Therefore, the scope of protection for the present invention should not be limited to the embodiments as disclosed, but should include various modifications and replacements that fall within the spirit of the present invention and is covered under the scope of the applied patent claims as follows.

What is claimed is:

1. A light pointing device employed in an input apparatus, wherein the input apparatus is an embedded-type touch panel having a plurality of sensors arranged by an array, the light pointing comprising:
    a signal receiving interface for receiving a system signal from the input apparatus, wherein the system signal is a vertical clock pulse;

a driving circuit for generating a driving signal only during an effective light sensing time of the input apparatus; and a light emitting component for generating a flashing light source in response to the driving signal, wherein the light emitting component is driven to generate the flashing light source by the driving signal, and the sensors are only activated at the effective light sensing time to sense the flashing light;

wherein the driving signal is synchronized with the vertical clock pulse, and a period of the driving signal is K times of that of the vertical clock pulse, where K is a positive integer and determined by a resolution of the sensors.

2. The light pointing device employed in an input apparatus as claimed in claim 1, wherein the signal receiving interface receives the system signal through wireless communication.

3. The light pointing device employed in an input apparatus as claimed in claim 1, wherein the signal receiving interface receives the system signal through a cable line.

4. The light pointing device employed in an input, apparatus as claimed in claim 1, wherein the light emitting component is a light emitting diode.

5. The light pointing device employed in an input apparatus as claimed in claim 1, further comprising a decoder converting a format of the system signal, and outputting the converted system signal to the driving circuit, such that the driving circuit generates the driving signal only during the effective light sensing time based on the converted system signal.

6. The light pointing device employed in an input apparatus as claimed in claim 1, wherein the light pointing device is a light pen.

7. A liquid crystal display device with an input function, comprising:

an input apparatus, wherein the input apparatus is an embedded-type touch panel having a plurality of sensors arranged by an array; and a light pointing device, comprising:

a signal receiving interface for receiving a system signal from the input apparatus, wherein the system signal is a vertical clock pulse;

a driving circuit for generating a driving signal only during an effective light sensing time of the input apparatus; and a light emitting component for generating a flashing light source in response to the driving signal, wherein the light emitting component is driven to generate the flashing light source by the driving signal, and the sensors are only activated at the effective light sensing time to sense the flashing light;

wherein the driving signal is synchronized with the vertical clock pulse, and a period of the driving signal is K times of that of the vertical clock pulse, where K is a positive integer and determined by a resolution of the sensors.

8. The liquid crystal display device with the input function as claimed in claim 7, wherein the light emitting component is a light emitting diode.

9. The liquid crystal display device with the input function as claimed in claim 7, wherein the light pointing device is a light pen.

10. A method for driving a light pointing device, comprising the steps of:

receiving a system signal from an input apparatus, wherein the system signal is a vertical clock pulse CPV signal, and the input apparatus is an embedded-type touch panel having a plurality of sensors arranged by an array;

generating a driving signal only during an effective light sensing time of the input apparatus; and generating, by a light emitting component, a flashing light source in response to the driving signal, wherein the light emitting component is driven to generate the flashing light source by the driving signal, and the sensors are only activated at the effective light sensing time to sense the flashing light, wherein the driving signal is synchronized with the vertical clock pulse, and a period of the driving signal is K times of that of the vertical clock pulse, where K is a positive integer and determined by a resolution of the sensors.

* * * * *